(12) United States Patent
Outhouse

(10) Patent No.: US 8,061,030 B2
(45) Date of Patent: Nov. 22, 2011

(54) CYLINDER HEAD INSERT METHOD

(76) Inventor: Henry J. Outhouse, Apopka, FL (US)

(\*) Notice: Subject to any disclaimer, the term of this patent is extended or adjusted under 35 U.S.C. 154(b) by 990 days.

(21) Appl. No.: 12/006,771

(22) Filed: Jan. 7, 2008

(65) Prior Publication Data

US 2009/0172938 A1    Jul. 9, 2009

(51) Int. Cl.
  *B23P 11/00* (2006.01)
  *B23P 11/02* (2006.01)
  *B21D 39/00* (2006.01)
  *F02F 1/24* (2006.01)

(52) U.S. Cl. ........... 29/888.06; 29/447; 29/525; 29/557; 123/193.5; 403/273

(58) Field of Classification Search .............. 29/888.06, 29/447, 525, 557; 123/193.5; 403/273
  See application file for complete search history.

(56) References Cited

U.S. PATENT DOCUMENTS 7,448,134 B2 \* 11/2008 Nagai et al. ............... 29/898.03

\* cited by examiner

*Primary Examiner* — Jermie Cozart
(74) *Attorney, Agent, or Firm* — William M. Hobby, III

(57) ABSTRACT

A cylinder head modification method includes the steps of selecting a cylinder head for an internal combustion engine having a plurality of combustion chambers and the cylinder head having a plurality of combustion chamber faces on the top of each combustion chamber. An elongated cylinder head insert is selected having a generally T-shaped cross-section and then forming an elongated slot in the selected cylinder head between a pair of combustion chamber faces. The elongated slot is shaped to receive the elongated cylinder head insert therein. A method includes press fitting the elongated cylinder head insert into the elongated slot and the cylinder head to thereby reduce localized high temperature deformations in the cylinder head. The method includes the step of heating the cylinder head to expand the slot for pressure fitting the cylinder head insert thereinto. The cylinder head insert is then nailed to a predetermined height above the cylinder head face after the cylinder head insert has been press fitted into the cylinder head slot.

6 Claims, 2 Drawing Sheets

CYLINDER HEAD INSERT METHOD

BACKGROUND OF THE INVENTION

The present invention relates to a cylinder head and especially to a cylinder head for a racing or high performance internal combustion engines and to a cylinder head modification. An elongated cylinder head insert is mounted into a slot in the cylinder head between a pair of combustion chambers.

An internal combustion engine normally has an engine block with one or more cylinder bores therein for the pistons to ride therein. The cylinder head forms the closed combustion chamber by attaching over the cylinder bores. In operation, a load is repeatedly applied to the engine to generate power and high performance in racing engines. The combustion face of the cylinder head is exposed to high temperatures resulting from the combustion of fuel within the combustion chamber to produce power. The high temperature in performance engines can result in high temperature deformations between the cylinder head combustion chambers in the cylinder head. This in turn can result in thermally induced stresses of a large magnitude which can shorten the life of the cylinder head and result in the engine having to be overhauled. As a result of this thermally applied stress, cracks frequently form on the cylinder head combustion face. These cracks can extend across the narrow bridges between the combustion chambers but may also extend in other directions resulting in the engine having to be overhauled and rebuilt on a more frequent basis.

The present invention is directed towards a method of modifying an existing internal combustion engine cylinder head to reduce high temperature deformations in racing or high performance engines and thus prolong the life of the cylinder head in the modified engine.

SUMMARY OF THE INVENTION

A cylinder head modification method includes the steps of selecting a cylinder head for an internal combustion engine having a plurality of combustion chambers having a cylinder head having a plurality of combustion chamber faces forming the top of each combustion chamber. An elongated cylinder head insert is selected having a generally T-shaped cross-section and an elongated slot is formed in the selected cylinder head between a pair of combustion chamber faces. The elongated slot is shaped to receive the elongated cylinder head insert therein. The method includes press fitting the elongated cylinder head insert into the elongated slot and the cylinder head to thereby reduce localized high temperature deformations in the cylinder head. The method includes the step of heating the cylinder head to expand the slot for pressure fitting the cylinder head insert thereinto. The cylinder head insert is then milled to a predetermined height above the cylinder head face after the cylinder head insert has been press fitted into the cylinder head slot. The slot formed into the cylinder head may be formed between the center two adjacent cylinder head combustion chamber head faces or between each two adjacent cylinder head combustion chamber head faces. A selected cylinder head insert may have a generally T-shaped cross-section having a radius edge on the bottom corners of the T.

A cylinder head apparatus for an internal combustion engine has a plurality of combustion chambers with each cylinder head having a plurality of combustion faces for fitting over the plurality of combustion chambers. The cylinder head has an elongated slot between two combustion chamber faces and has an elongated cylinder head insert having a generally T-shaped cross-section press fitted into the cylinder head slot to form a cylinder head having reduced high temperature deformations between cylinder head combustion chamber faces.

BRIEF DESCRIPTION OF THE DRAWINGS

Other objects, features, and advantages of the present invention will be apparent from the written description and the drawings in which.

DETAILED DESCRIPTION OF THE PREFERRED EMBODIMENT

Figure 1:
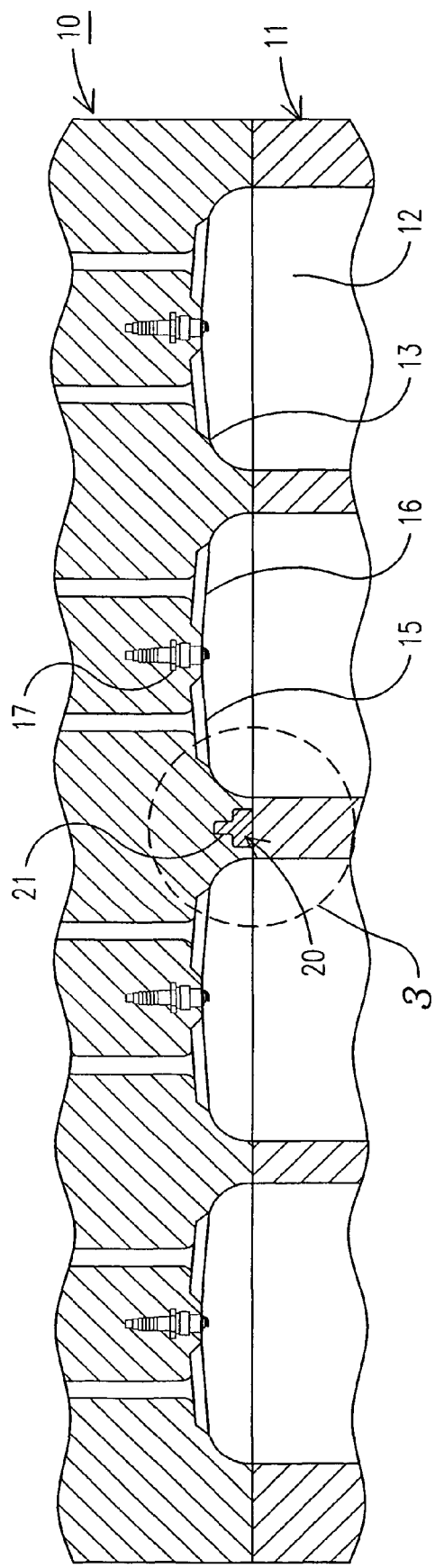
FIG. 1 is a cross-sectional view of-an internal combustion engine combustion chamber having a cylinder head and the cylinder head inserts in accordance with the present invention.
Figure 2:
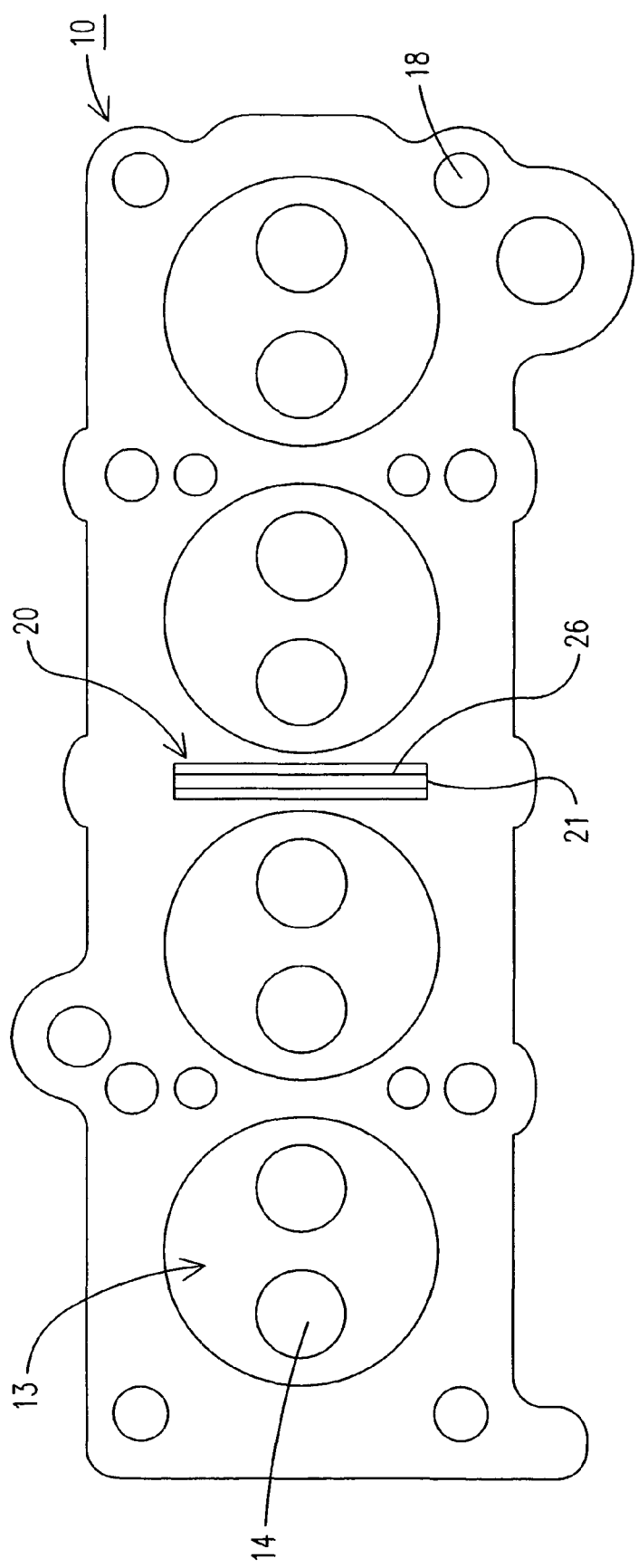
FIG. 2 is a sectional view of the face of a cylinder head having an insert in accordance with the present invention.

Referring to the drawings, FIGS. 1 through 4, a cylinder head 10 is shown in FIG. 1 attached to an engine block 11 having cylinder bores 12 therein forming a combustion chamber with the cylinder head 10 face or top 13. The cylinder head has a plurality of valve openings 14 each having a valve 15 and 16 therein which may include an intake valve for a fuel charge to enter into the combustion chamber and an exhaust valve for exhausting the burnt gases from the combustion chamber. The cylinder head has mounted therethrough a spark plug 17 for each combustion chamber. The cylinder head, as seen in FIG. 2, also has a plurality of bolt openings 18 for attaching the cylinder 10 to the engine block 11.

Figure 4:
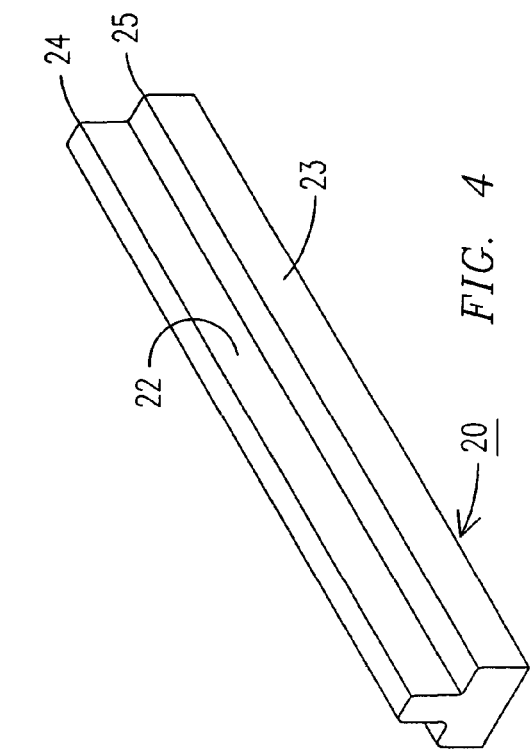
FIG. 4 is a perspective view of a cylinder insert in accordance with the present invention.
Figure 3:
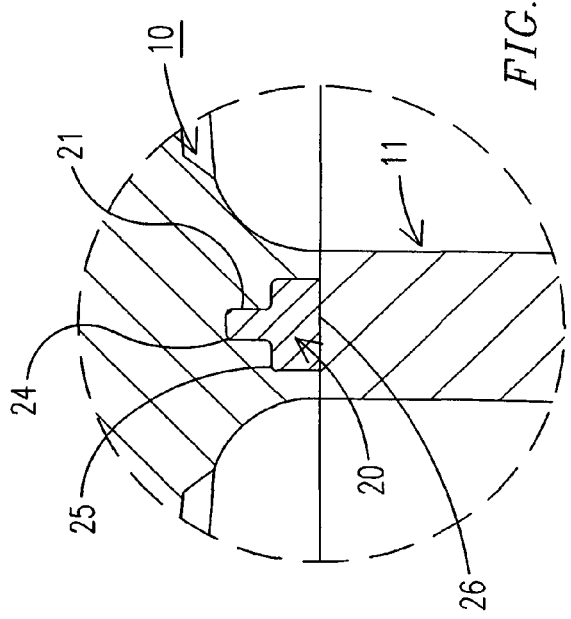
FIG. 3 is a sectional view of the circle 3 of FIG. 1.

An elongated cylinder head insert 20, as seen in FIG. 4, is shown inserted into a slot 21 in the cylinder head 10 as seen in FIGS. 1, 2 and 3. The slot 21 has been formed or cut into the cylinder head 10 between a pair of cylinder head combustion chamber faces 13, as seen in FIG. 2. The cylinder head insert 20 is seen as a generally T-shaped cross-section having a center leg 22 and cross-bar or top 23. The top of the "T" is seen to be thicker than the leg 22 so that the cross-section of the insert 20 forms a generally T-shape while the slot 21 has the identical shape for receiving the insert 20 thereinto. The slot 21 has been made exact or slightly smaller than the insert 20 so that the insert 20 can be press fitted thereinto. The insert 20 has a radius or curved edges 24 at the corner of the bottom of the "T" as well as 25 at the bottom of the cross-bar. The slot 21 has been cut to exactly match the slight radius of the corners of the T-shaped insert.

The method of the present invention requires the selecting or making of the insert 20 of a predetermined shape and then cutting the slot 21 of a shape to exactly receive the insert 20 allowing it to protrude slightly above the face of the cylinder head 10. The cylinder head 10 is then heated either in its entirety or at least in the area of the cut slot 21 to slightly expand the slot so that the insert 20 can be press fitted thereinto. The top 26 of the insert 21 is then milled down so it protrudes just slightly over the surface of the face of the cylinder head. The top of the insert 26 may be milled to 0.001 inch above the surface of the cylinder head to allow for the insert to be clamped against the engine block 11. The cylinder head insert 20 is shown placed between the two combustion chamber faces of a cylinder head for a four cylinder engine but can be placed between each two cylinders as desired and depending upon the engine being modified.

The cylinder head insert in accordance with the present invention is specifically made for racing engines or very high performance engines which tend to have a short life because of the high temperature deformations causing stresses and cracks within the cylinder head. It should be clear at the present time that a modified cylinder head has been provided as well as a method of modifying a cylinder head to reduce localized high temperature deformations-in the cylinder head. However, the present invention is not to be construed as limited to the forms shown which are to be considered illustrative rather than restrictive.

I claim:

1. A cylinder head modification method comprising the steps of:
    selecting a cylinder head for an internal combustion engine having a plurality of combustion chambers, said cylinder head having a plurality of combustion chamber faces;
    selecting an elongated cylinder head insert having a generally T-shaped cross-section;
    forming an elongated slot in said selected cylinder head between a pair of combustion chamber faces, said elongated slot shaped to receive said elongated cylinder head insert therein;
    press fitting said elongated cylinder head insert into said elongated slot in said cylinder head to thereby reduce localized high temperature deformations in said cylinder head.

2. The cylinder head modification method in accordance with claim 1 including the step of heating said cylinder head to expand said slot for pressure fitting said cylinder head insert thereinto.

3. The cylinder head modification method in accordance with claim 2 including the step of milling said cylinder head insert to a predetermined height above said cylinder head face after said cylinder head insert has been pressed fitted into said cylinder head slot.

4. The cylinder head modification method in accordance-with claim 1 in which the step of forming a slot includes forming a slot between each two adjacent cylinder head combustion chamber head faces.

5. The cylinder head modification method in accordance with claim 4 in which the step of selecting a cylinder head insert having a generally T-shaped cross-section having curved edges on the bottom of the "T".

6. The cylinder head modification method in accordance with claim 5 in which the step of selecting a cylinder head insert includes selecting a cylinder head insert having a generally T-shaped cross-section having the cross bar of the "T" thicker than the leg.

* * * * *